(12) United States Patent
Gibson et al.

(10) Patent No.: US 10,559,134 B2
(45) Date of Patent: Feb. 11, 2020

(54) DRIVER BACKUP ASSISTANCE SYSTEM FOR VEHICLE

(71) Applicant: MAGNA ELECTRONICS INC., Auburn Hills, MI (US)

(72) Inventors: Joel S. Gibson, Linden, MI (US); Steven V. Byrne, Goodrich, MI (US); Richard D. Shriner, Grand Blanc, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 16/234,760

(22) Filed: Dec. 28, 2018

(65) Prior Publication Data

US 2019/0139316 A1 May 9, 2019

Related U.S. Application Data

(63) Continuation of application No. 16/029,750, filed on Jul. 9, 2018, now Pat. No. 10,169,926, which is a
(Continued)

(51) Int. Cl.
*G06T 19/00* (2011.01)
*B60R 1/00* (2006.01)
*H04N 17/00* (2006.01)

(52) U.S. Cl.
CPC .............. *G06T 19/006* (2013.01); *B60R 1/00* (2013.01); *H04N 17/002* (2013.01); *B60R 2300/305* (2013.01); *B60R 2300/806* (2013.01)

(58) Field of Classification Search
CPC ........ G06T 19/006; B60R 1/00; H04N 17/002
See application file for complete search history.

(56) References Cited

U.S. PATENT DOCUMENTS

| 5,289,321 | A | 2/1994 | Secor |
| 5,359,363 | A | 10/1994 | Kuban et al. |

(Continued)

FOREIGN PATENT DOCUMENTS

| JP | 69114139 | 7/1984 |
| JP | 05133336 | 9/1984 |

(Continued)

OTHER PUBLICATIONS

Ballard, Dana H. et al., "Computer Vision", 1982, p. 88-89, sect. 3.4.1.

(Continued)

*Primary Examiner* — Sarah Lhymn
(74) *Attorney, Agent, or Firm* — Honigman LLP

(57) ABSTRACT

A method for providing backup assistance includes providing a rear backup camera and a processor at a vehicle, and storing a plurality of mathematical formulas in memory, with each stored formula associated with a respective vehicle wheelbase configuration. A wheelbase configuration input is provided that is representative of the wheelbase configuration of the vehicle. Responsive at least in part to the input, a mathematical formula is selected from the stored formulas. Responsive to a steering angle input, the processor selects a value to be input into the selected mathematical formula. During the reversing maneuver of the vehicle, a predicted vehicle trajectory overlay is generated by calculating, via the selected mathematical formula and using the selected value, an overlay representative of the predicted vehicle trajectory of the vehicle. The predicted vehicle trajectory overlay is superimposed over displayed video images for viewing by the driver of the vehicle during the reversing maneuver.

21 Claims, 6 Drawing Sheets

Related U.S. Application Data continuation of application No. 14/117,759, filed as application No. PCT/US2011/036967 on May 18, 2011, now Pat. No. 10,019,841.

(56) References Cited

U.S. PATENT DOCUMENTS

| | | | |
|---|---|---|---|
| 5,410,346 | A | 4/1995 | Saneyoshi et al. |
| 5,414,461 | A | 5/1995 | Kishi et al. |
| 5,444,478 | A | 8/1995 | Lelong et al. |
| 5,574,443 | A | 11/1996 | Hsieh |
| 5,793,308 | A | 8/1998 | Rosinski et al. |
| 5,949,331 | A | 9/1999 | Schofield et al. |
| 6,155,377 | A | 12/2000 | Tokunaga et al. |
| 6,256,561 | B1 | 7/2001 | Asanuma |
| 6,578,017 | B1 | 6/2003 | Ebersole et al. |
| 6,631,994 | B2 | 10/2003 | Suzuki et al. |
| 7,295,227 | B1* | 11/2007 | Asahi ................ B60R 1/00 348/118 |
| 7,843,451 | B2 | 11/2010 | Lafon |
| 7,930,160 | B1 | 4/2011 | Hosagrahara et al. |
| 8,405,724 | B2 | 3/2013 | Jeon et al. |
| 8,451,107 | B2 | 5/2013 | Lu et al. |
| 10,019,841 | B2 | 7/2018 | Gibson et al. |
| 10,169,926 | B2 | 1/2019 | Gibson et al. |
| 2002/0120371 | A1 | 8/2002 | Leivian et al. |
| 2002/0128754 | A1 | 9/2002 | Sakiyama et al. |
| 2006/0287826 | A1 | 12/2006 | Shimizu et al. |
| 2007/0038422 | A1 | 2/2007 | Wang et al. |
| 2007/0120657 | A1 | 5/2007 | Schofield et al. |
| 2007/0194899 | A1 | 8/2007 | Lipman |
| 2008/0129539 | A1* | 6/2008 | Kumon ................ B60R 1/00 340/901 |
| 2008/0231701 | A1* | 9/2008 | Greenwood ............ B60R 1/00 348/148 |
| 2008/0266541 | A1 | 10/2008 | Yung et al. |
| 2008/0300745 | A1 | 12/2008 | Goossen et al. |
| 2009/0179916 | A1 | 7/2009 | Williams et al. |
| 2012/0316779 | A1 | 12/2012 | Kanno et al. |
| 2014/0032184 | A1 | 1/2014 | Carrasco et al. |

FOREIGN PATENT DOCUMENTS

| | | |
|---|---|---|
| JP | 6079889 | 5/1985 |
| JP | 6080953 | 5/1985 |
| JP | 6272245 | 5/1987 |
| JP | 62122487 | 6/1987 |
| JP | 6414700 | 1/1989 |
| JP | 04114587 | 4/1992 |
| JP | 0550883 | 3/1993 |
| JP | 0577657 | 3/1993 |
| JP | 5213113 | 8/1993 |
| JP | 06227318 | 8/1994 |
| JP | 074170 | 1/1995 |
| JP | 07105496 | 4/1995 |
| JP | 2630604 | 7/1997 |

OTHER PUBLICATIONS

International Search Report and Written Opinion dated Sep. 9, 2011 for PCT Application No. PCT/US2011/036967.

Tokumaru et al., "Car Rear-View TV System with CCD Camera," National Technical Report vol. 34, No. 3, pp. 329-336, Jun. 1988 (Japan).

Wang et al., CMOS Video Cameras, article, 1991, 4 pages, University of Edinburgh, UK.

"Edmunds", combined screen shots from http://www.edmunds.com/bmw/5-series/2010/features-specs.html?sub=sedan&style=101166700 (last visited Apr. 20, 2015) and http://web.archive.org/web/20110223063738*/http://www.edmunds.com/bmw/5-series/2010/features-specs.html (last visited Apr. 20, 2015) (Edmunds last saved Feb. 23, 2011).

Kannan, Saravanan et al., "An Intelligent Driver Assistance System (I-DAS) for Vehicle Safety Modelling Using Ontology Approach." International Journal of Ubicomp (IJU) vol. 1, No. 3 (Jul. 2010), pp. 15-29.

* cited by examiner

| OVERLAY MAP COUNT | WHEEL BASE (inch) | 100" | 110" | 120" | 130" |
|---|---|---|---|---|---|
| | OVERLAY RADIUS (mm) | SWA SWITCH (deg) | SWA SWITCH (deg) | SWA SWITCH (deg) | SWA SWITCH (deg) |
| 22-1 | 42500 | 30 | 40 | 40 | 40 |
| 22-2 | 22500 | 110 | 120 | 130 | 140 |
| 22-3 | 15800 | 180 | 190 | 210 | 220 |
| 22-4 | 12400 | 240 | 250 | 270 | 300 |
| 22-5 | 10400 | 300 | 320 | 340 | 370 |
| 22-6 | 9000 | 360 | 380 | 410 | 430 |
| 22-7 | 8100 | 410 | 430 | 460 | 490 |
| 22-8 | 7400 | 450 | 470 | 500 | 540 |
| 22-9 | 6800 | 490 | 510 | 550 | 590 |
| 22-10 | 6400 | 530 | 550 | 600 | 640 |
| 22-11 | 6000 | 570 | 600 | 630 | 670 |
| 22-12 | 5700 | 600 | 630 | 660 | 690 |
| 22-13 | 5400 | 630 | 650 | 680 | |
| 22-14 | 5200 | 650 | 670 | | |
| 22-15 | 5100 | 670 | 690 | | |
| 22-16 | 4900 | 690 | | | |
| 22-17 | 4800 | 700 | | | |

| OVERLAY MAP COUNT | WHEEL BASE (inch) | | 11a 100" | 11b 110" | 11c 120" | 11d 130" | 11c 120" | 11d 130" | 11e 140" |
|---|---|---|---|---|---|---|---|---|---|
| | STEERING GEAR | | 36a 1 | 36a 1 | 36a 1 | 36a 1 | 36b 2 | 36b 2 | 36b 2 |
| | OVERLAY RADIUS (mm) | | SWA SWITCH (deg) | SWA SWITCH (deg) | SWA SWITCH (deg) | SWA SWITCH (deg) | SWA SWITCH (deg) | SWA SWITCH (deg) | SWA SWITCH (deg) |
| 22-1 | 42500 | | 30 | 40 | 40 | 40 | 30 | 40 | 40 |
| 22-2 | 22500 | | 110 | 120 | 130 | 140 | 110 | 120 | 120 |
| 22-3 | 15800 | | 180 | 190 | 210 | 220 | 180 | 190 | 200 |
| 22-4 | 12400 | | 240 | 250 | 270 | 300 | 240 | 260 | 270 |
| 22-5 | 10400 | | 300 | 320 | 340 | 370 | 300 | 320 | 340 |
| 22-6 | 9000 | | 360 | 380 | 410 | 430 | 350 | 380 | 390 |
| 22-7 | 8100 | | 410 | 430 | 460 | 490 | 400 | 420 | 440 |
| 22-8 | 7400 | | 450 | 470 | 500 | 540 | 440 | 470 | 490 |
| 22-9 | 6800 | | 490 | 510 | 550 | 590 | 480 | 520 | 530 |
| 22-10 | 6400 | | 530 | 550 | 600 | 640 | 520 | 550 | 570 |
| 22-11 | 6000 | | 570 | 600 | 630 | 670 | 550 | 580 | 590 |
| 22-12 | 5700 | | 600 | 630 | 660 | 690 | 570 | 600 | |
| 22-13 | 5400 | | 630 | 650 | 680 | | 590 | | |
| 22-14 | 5200 | | 650 | 670 | | | | | |
| 22-15 | 5100 | | 670 | 690 | | | | | |
| 22-16 | 4900 | | 690 | | | | | | |
| 22-17 | 4800 | | 700 | | | | | | |

DRIVER BACKUP ASSISTANCE SYSTEM FOR VEHICLE

CROSS REFERENCE TO RELATED APPLICATIONS

The present application is a continuation of U.S. patent application Ser. No. 16/029,750, filed Jul. 9, 2018, now U.S. Pat. No. 10,169,926, which is a continuation of U.S. patent application Ser. No. 14/117,759, filed Nov. 14, 2013, now U.S. Pat. No. 10,019,841, which is a 371 national phase filing of PCT Application No. PCT/US2011/036967, filed May 18, 2011.

FIELD OF THE INVENTION

The present invention relates to vehicular cameras and more particularly to rearview vehicular cameras that display overlays onto the camera image.

BACKGROUND OF THE INVENTION

Vehicular cameras are used for a variety of purposes, such as to assist a driver in avoiding obstacles behind a vehicle when backing up. Some cameras add overlays onto the camera image to assist the driver in determining distances to obstacles behind the vehicle, vehicle trajectory and other useful information. The overlays may be static or may be dynamic. A dynamic overlay is an overlay that is changed by the camera based on certain inputs. For example, some cameras display a predicted vehicle trajectory based on certain factors such as steering wheel angle. The overlays, whether static or dynamic, will change depending on the angle of mounting of the camera, the height of the camera off the ground, distance from the camera horizontally to the rear axle of the vehicle, the steering gear ratio for the vehicle, and possibly other factors. As a result, cameras for different vehicles up until now have had different programming and thus have different part numbers associated with them. This results in a potentially large number of part numbers and inventory. A particular vehicle family, such as a particular truck, may have numerous vehicle configurations that will impact the overlays that are displayed by the rearview camera. Such configurations would include, for example, regular cab with short bed, regular cab with long bed, extended cab with short bed and extended cab with long bed.

It would be desirable to reduce the number of separate part numbers that are associated with variations on programming for essentially the same camera.

SUMMARY OF THE INVENTION

In one aspect, the invention is directed to a vehicular camera including a housing, a lens, an image sensor positioned for receiving images from the lens, a processor, and a memory. The memory contains a plurality of overlays. The processor is programmed to receive first input data from a vehicle in which the camera is to be mounted, wherein the first input data correspond to the configuration of the vehicle, and select a particular overlay to display based at least in part on the input received.

BRIEF DESCRIPTION OF THE DRAWINGS

The present invention will now be described by way of example only with reference to the attached drawings in which:

FIG. 5 is a lookup table that is used by the camera to determine which overlay to use on an image; and FIG. 6 is another lookup table that is used by an enhanced version of the camera to determine which overlay to use on an image.

DETAILED DESCRIPTION OF THE INVENTION

Figure 1:
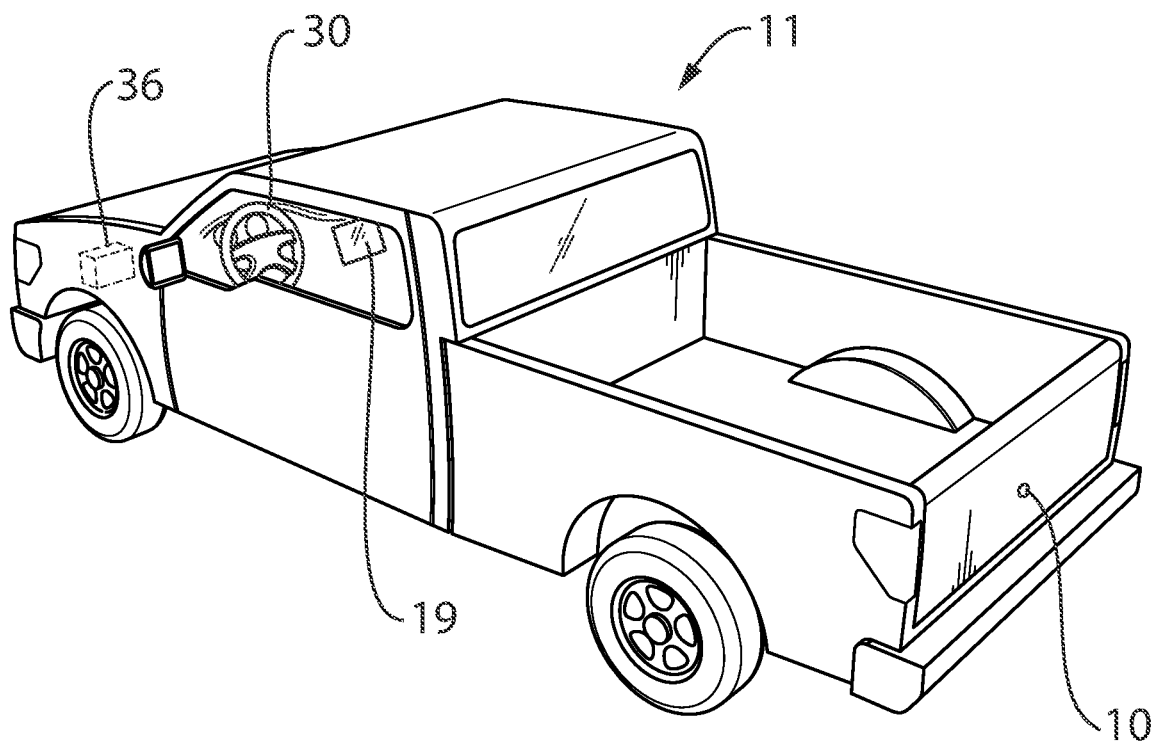
FIG. 1 is a perspective view of a vehicle with a vehicular camera in accordance with an embodiment of the present invention.
Figure 2:
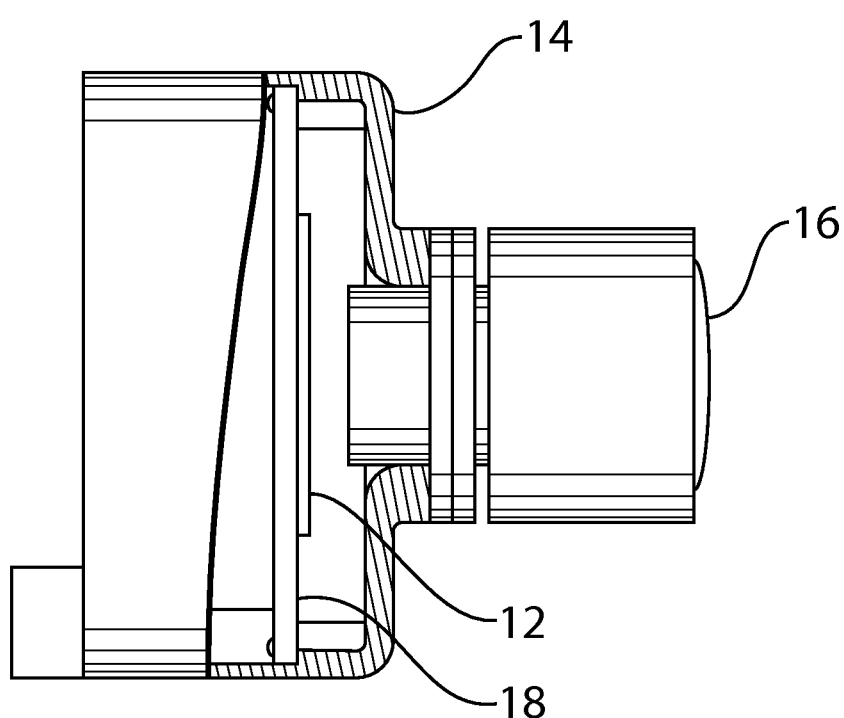
FIG. 2 is a cutaway side view of the vehicular camera shown in FIG. 1.
Figure 3:
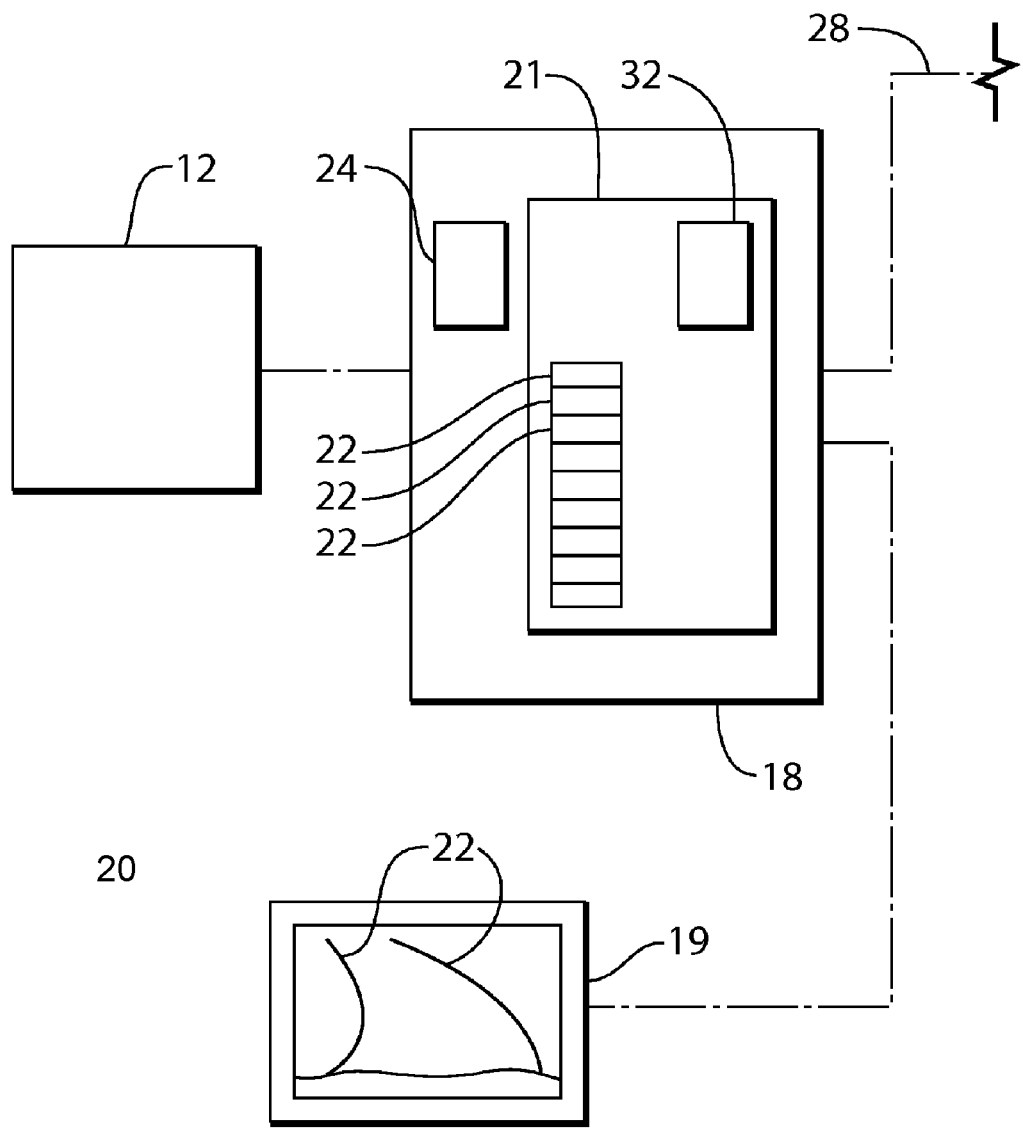
FIG. 3 is a schematic illustration of selected components from the camera shown in FIG. 1.
Figure 4:
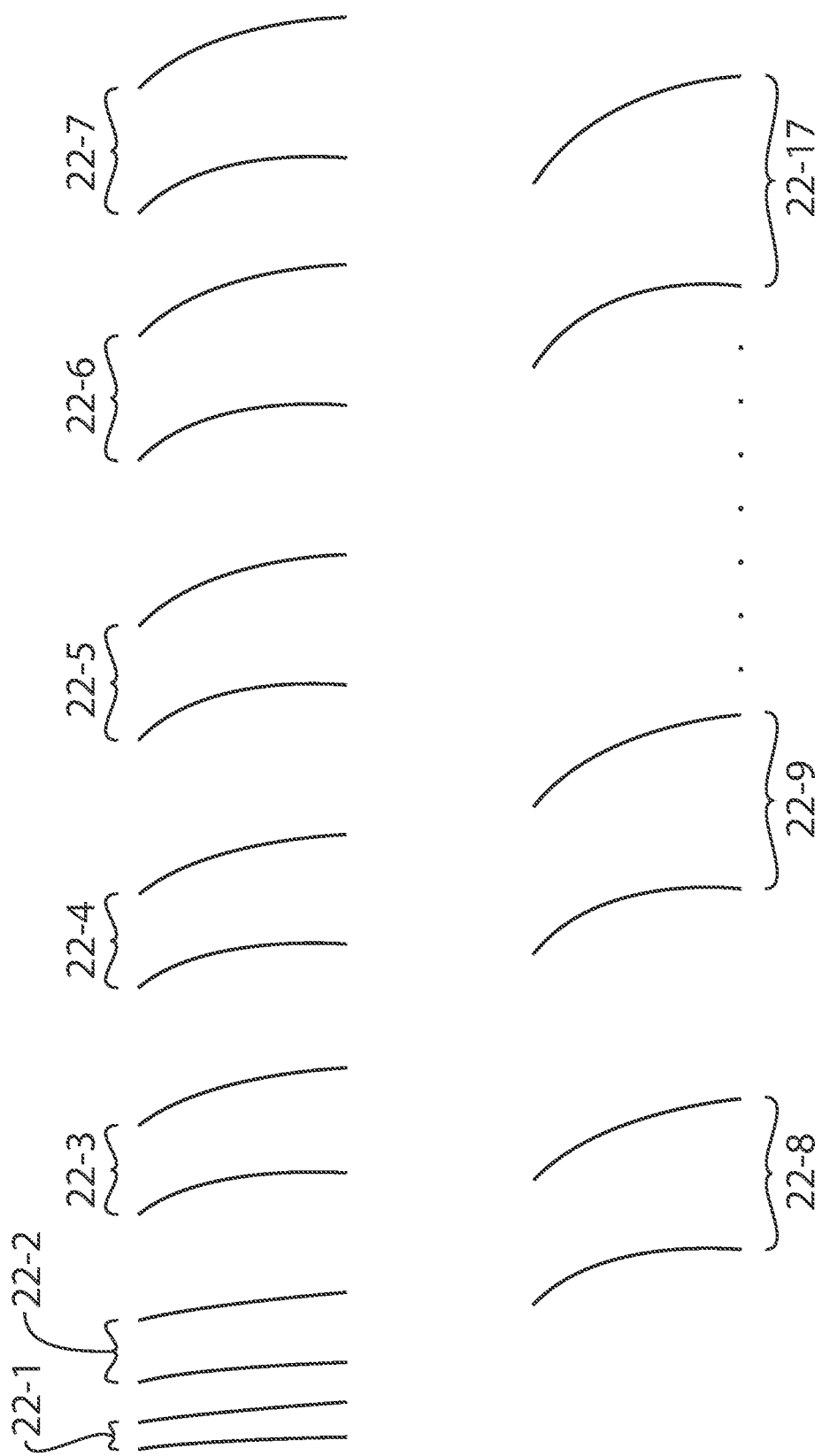
FIG. 4 is an illustration of selected overlays that are stored in a memory that is part of the camera shown in FIG. 1.

Reference is made to FIG. 1, which shows an exploded view of a vehicular camera 10 for a vehicle 11, in accordance with an embodiment of the present invention. In the embodiment shown, the camera 10 is a rearview camera that is configured to assist a vehicle driver when backing the vehicle up. Referring to FIG. 2, the vehicular camera 10 includes an image sensor 12 (e.g., a CCD or a CMOS sensor), a housing 14, a lens 16, and an image processing board 18. The lens 16 transmits and focuses images from behind the vehicle 11 onto the image sensor 12. Referring to FIG. 3, the image processing board 18 communicates with and receives images from the image sensor 12 and transmits the images to other vehicular devices, such as an in-cabin display 19. The images are shown at 20. Referring to FIG. 3, the image processing board 18 includes a memory 21 in which is stored a set of overlays 22-1, 22-2, 22-3, 22-4, 22-5, 22-6, 22-7, 22-8, 22-9 . . . 22-17 (FIG. 4) and a processor 24 (FIG. 3) which selects an overlay to add to the images 20 (FIG. 3) prior to sending the images to the in-cabin display 19.

The overlays 22-1, 22-2, 22-3, 22-4, 22-5, 22-6, 22-7, 22-8, 22-9 . . . 22-17 (FIG. 4) are dynamic overlays in the sense that the processor 24 selects different ones to apply to the image 20 depending on certain criteria. For example, in the example shown, the overlays 22-1, 22-2, 22-3, 22-4, 22-5, 22-6, 22-7, 22-8, 22-9 . . . 22-17 represent predicted vehicle trajectories based on certain data concerning the vehicle 11.

As shown in FIG. 3, the camera 10 receives input data from the vehicle 11 via a bus 28 (e.g., a LIN bus). The input data may include first input data which corresponds to the particular configuration of vehicle 11 the camera 10 is mounted to. For example, a particular vehicle family may include a range of vehicle configurations, covering vehicles with 4 different wheelbases. In this simplified example, other aspects of the vehicle configurations, such as the distance from the camera to the rear axle, are the same for each vehicle. The first input data would indicate to the camera 10 which of the 4 different vehicles the camera 10 is mounted to.

The input data may further include second input data which corresponds to the angle of the steering wheel in the vehicle 11. The steering wheel is shown at 30 in FIG. 1.

The processor 24 uses the first and second input data to identify which overlay 22 to use on the images 20. The processor 24 may achieve this in any suitable way. One such way is by using the first and second input data as input parameters for a lookup table shown at 32 that is stored in the memory 21.

The lookup table 32 is shown in more detail in FIG. 5. As can be seen, and by way of example only, the aforementioned 4 different vehicle configurations are represented at 11a, 11b, 11c and 11d. A set of steering wheel angles are shown at 34 for each of the vehicle configurations 11a-11d. As can be seen, for vehicle configuration 11a (which has a wheelbase of 100°), if the second input data indicated a steering wheel angle of 240 degrees, the processor 24 would add the overlay shown at 22-4 in FIG. 4, to the image 20 (FIG. 3) prior to transmitting the image 20 with the overlay 22-4 to the in-cabin display 19. As another example, for vehicle configuration 11c (which has a wheelbase of 120°), if the second input data indicated a steering wheel angle of 460 degrees, the processor 24 would add the overlay shown at 22-7 in FIG. 4, to the image 20 (FIG. 3) prior to transmitting the image 20 with the overlay 22-7 to the in-cabin display 19.

It can be seen that the lookup table 32 does not require a substantial amount of the memory 21. Furthermore it can be seen that the total number of overlays 22 that needs to be stored in the memory 21 is no more than would need to be stored for the vehicle configuration 11a. It will be noted that for the 4 vehicle configurations shown in the lookup table 32, 13 of the overlays 22 (i.e., overlays 22-1 to 22-13 are common to all of the vehicle configurations, a further one overlay (22-14) is common to 3 of them, a further 2 overlays (22-15 and 22-16) are common to 2 of them, and only 2 overlays (22-17 and 22-18) are unique to one of them. Accordingly, the amount of memory consumed by providing the capability of handling 4 different vehicle configurations is not substantially more than the amount of memory already provided on such image processing boards when handling a single vehicle configuration. Additionally, the use of a lookup table is not computationally stressful for the processor 24.

However, it is alternatively possible that instead of a lookup table to determine which overlay 22 to use, the processor 24 could use the steering wheel angle data and the vehicle configuration data to calculate the projected vehicle trajectory and to then select an overlay 22 that is suitable. As another alternative, it is possible for the overlays to be mathematically generated by the processor 24 based on the steering wheel angle data and the vehicle configuration data. In other words, the processor 24 could, using the steering wheel angle data and the vehicle configuration data, calculate the curve on which to draw an overlay 22 instead of grabbing a premade overlay 22 from memory. In such an embodiment, the processor 24 could calculate an entirely new overlay each time it samples the steering wheel angle input, or it could calculate an adjustment to make to the previously drawn overlay each time it samples the steering wheel angle input. In either case, the processor 24 would be capable of drawing a continuous range of overlays 22 as compared to embodiments wherein a premade overlay 22 is pulled from memory and used over a range of steering wheel angles. In such an embodiment, the vehicle configuration data can be used to modify the formulas used by the processor 24 to determine the appropriate curve of the overlay 22. These modifications to the formulas (e.g., values for certain constants in the formulas) may be stored in an array or a lookup table stored in memory 21, and which is accessed by the processor 24 based on the vehicle configuration data. The aforementioned lookup table described above is the preferred approach, however.

It will be noted that, in part, many of the overlays 22 are common to the different vehicle configurations because the vehicle configurations are part of the same vehicle family. As such, many of the parameters that would impact the appearance of the overlays would be the same for all members of the vehicle family. Such parameters would include for example, the lateral distance of the camera from the edge of the vehicle, the height of the camera from the ground and the angle of the camera relative to horizontal.

Reference is made to FIG. 6, which shows a variant of the lookup table 32 that will be used to describe an enhancement to the embodiment shown in FIGS. 1-5. In some vehicle families it may be that the vehicle may be fitted with one of two different steering gear mechanisms each with its own gear ratio. The steering gear mechanism is shown in dashed outline at 36 in (FIG. 1). The two alternative steering gear mechanisms that could be used in the vehicle are shown at 36a and 36b in FIG. 6. As can be seen, the vehicle family shown in FIG. 6 includes 5 different vehicle configurations (shown at 11a-11e in FIG. 6), each with its own wheelbase. The first steering gear mechanism 36a can be used on 4 of the configurations. The second steering gear mechanism 36b can be used on 3 of the configurations.

In some cases the particular steering gear mechanism 36 used on the vehicle 11 may not be reflected in the vehicle configuration data (i.e., the first input data) that is transmitted to the camera 10. It will be understood of course that without knowing which steering gear mechanism (more particularly, which gear ratio) is used, the camera 10 does not have enough information based solely on the vehicle configuration and the steering wheel angle to determine the projected vehicle trajectory. In the particular exemplary case shown in FIG. 6, if the vehicle configuration data indicates that the vehicle is of type 11a or 11b, the processor 24 would have sufficient data because those configurations only use steering gear mechanism 36a. Similarly, if the vehicle configuration data indicates that the vehicle is of type 11e, the processor 24 would have sufficient data because those configurations only use steering gear mechanism 36b. However, if the vehicle configuration data indicates that the vehicle is of type 11c or 11d, the processor 24 would not have sufficient data because either steering gear mechanism 36a or 36b could be used with those configurations.

In order to determine which of the two steering gear mechanisms 36a or 36b is used on the vehicle 11, the camera 10 is activated and notified when the steering wheel 30 (FIG. 1) is turned to full lock. The second input data (i.e., the steering wheel angle data) is transmitted to the camera 10, and the processor 24 compares it to the maximum steering wheel angle shown in the lookup table 32 (FIG. 6) for that particular vehicle configuration. For example, for vehicle configuration 11c, if the steering wheel angle data (i.e., the second input data) sent to the camera 10 indicates 680 degrees of rotation, then the processor 24 can determine that the first steering gear mechanism 36a is being used on the vehicle 11. Alternatively, if the steering wheel angle data (i.e., the second input data) sent to the camera 10 indicates 590 degrees of rotation, then the processor 24 can determine that the first steering gear mechanism 36b is being used on the vehicle 11.

While the example overlays shown and described herein relate to the predicted vehicle trajectory, it will be understood that other overlays relating to other vehicle properties could be displayed. Additionally it will be understood that the overlays 22 shown and described may not be the only overlays shown on the images 20. Additionally dynamic and/or static overlays could also be shown on the images by the camera.

The processor 24 and memory 21 have been shown in FIG. 3 to be on an image processing board 18. The image sensor 12 may be attached directly to the board 18. It is alternatively possible for the processor 24 to reside on a separate board (not shown), which is distinct from the board to which the image sensor 12 is attached. In another alternative it is possible for the processor 24 to comprise a processor that is integral with the image sensor 12 and one that is separate from the image sensor 12. In such an alternative, both processors are collectively referred to as processor 24. In yet another alternative, it is possible for the processor 24 to comprise an external processor that is outside the housing 14 of the camera 10 that cooperates with one or more processors that are contained within the housing 14. In such an embodiment, such an external processor may be positioned anywhere within the vehicle.

Similarly, the memory 21 may alternatively reside on a board to which the image sensor 12 is integrally attached, or on a board that is separate from the board to which the image sensor 12 is attached. Alternatively the memory 21 may reside in part on the board to which the image sensor 12 is attached and in part on a board that is separate from the board to which the image sensor 12 is attached, in which case the two portions of the memory would collectively be referred to as the memory 21. In yet another alternative, it is possible for the memory 21 to comprise an external processor that is outside the housing 14 of the camera 10 that cooperates with one or more memories that are contained within the housing 14. In such an embodiment, such an external memory may be positioned anywhere within the vehicle.

While the above description constitutes a plurality of embodiments of the present invention, it will be appreciated that the present invention is susceptible to further modification and change without departing from the fair meaning of the accompanying claims.

The invention claimed is:

1. A method for providing backup assistance for a driver of a vehicle, said method comprising:
    equipping a vehicle with a rear backup camera having a field of view at least rearward of the equipped vehicle;
    providing a processor at the equipped vehicle;
    wherein the processor is operable to generate an overlay for superimposing over video images displayed at a video display screen of the equipped vehicle for viewing by a driver of the equipped vehicle during a reversing maneuver of the equipped vehicle, wherein the displayed video images are derived from image data captured by said rear backup camera during the reversing maneuver of the equipped vehicle;
    wherein the overlay comprises a pair of spaced apart guidelines representative of a predicted vehicle trajectory during the reversing maneuver of the equipped vehicle;
    storing a plurality of mathematical formulas in memory, wherein each stored mathematical formula is associated with a respective vehicle wheelbase configuration of a plurality of different vehicle wheelbase configurations;
    providing a wheelbase configuration input to the processor that is representative of the vehicle wheelbase configuration of the equipped vehicle;
    selecting, via the processor, and responsive at least in part to the wheelbase configuration input, a selected mathematical formula from the stored plurality of mathematical formulas;
    providing a steering angle input to the processor that is representative of a steering angle of the equipped vehicle during the reversing maneuver of the equipped vehicle;
    selecting, via the processor, and responsive at least in part to steering angle of the equipped vehicle during the reversing maneuver of the equipped vehicle, a value to be input into the selected mathematical formula based at least in part on the provided steering angle input;
    generating a predicted vehicle trajectory overlay by calculating, via the selected mathematical formula and using the selected value, an overlay that is representative of the predicted vehicle trajectory of the equipped vehicle based on the current steering angle of the equipped vehicle, wherein the predicted vehicle trajectory overlay comprises a pair of spaced apart guidelines; and
    during the reversing maneuver of the equipped vehicle, (i) displaying video images at the video display screen of the equipped vehicle derived from image data captured by the rear backup camera for viewing by the driver of the equipped vehicle and (ii) superimposing the generated predicted vehicle trajectory overlay over the displayed video images for viewing by the driver of the equipped vehicle.

2. The method of claim 1, wherein providing a wheelbase configuration input to the processor comprises providing, via a bus communication of the equipped vehicle, a wheelbase configuration input to the processor that is representative of the vehicle wheelbase configuration of the equipped vehicle.

3. The method of claim 1, wherein providing a steering angle input to the processor comprises providing a steering wheel angle input to the processor that corresponds to a steering wheel angle of a steering wheel of the equipped vehicle.

4. The method of claim 3, wherein, if the vehicle wheelbase configuration of the equipped vehicle is available with different steering gear ratios, said method comprises (i) providing a value in the steering wheel angle input that is representative of when the steering wheel of the equipped vehicle is at full lock, and (ii) determining, via the processor, information regarding the steering gear ratio of the equipped vehicle based at least in part on the provided steering wheel angle input.

5. The method of claim 1, wherein selecting a value to be input into the selected mathematical formula comprises selecting a value for at least one constant in the selected mathematical formula.

6. The method of claim 1, wherein selecting the selected mathematical formula comprises selecting a selected mathematical formula from a lookup table of mathematical formulas stored in memory.

7. The method of claim 1, wherein the plurality of mathematical formulas stored in memory includes a first mathematical formula corresponding to a first vehicle wheelbase configuration and a second mathematical formula corresponding to a second vehicle wheelbase configuration.

8. The method of claim 7, wherein selecting, via the processor, a selected mathematical formula from the stored plurality of mathematical formulas comprises selecting the first mathematical formula responsive to the provided wheelbase configuration input being indicative of the equipped vehicle having the first vehicle wheelbase configuration.

9. The method of claim 7, wherein selecting, via the processor, a selected mathematical formula from the stored plurality of mathematical formulas comprises selecting the second mathematical formula responsive to the provided wheelbase configuration input being indicative of the equipped vehicle having the second vehicle wheelbase configuration.

10. A method for providing backup assistance for a driver of a vehicle, said method comprising:
equipping a vehicle with a rear backup camera having a field of view at least rearward of the equipped vehicle;
providing a processor at the equipped vehicle;
wherein the processor is operable to generate an overlay for superimposing over video images displayed at a video display screen of the equipped vehicle for viewing by a driver of the equipped vehicle during a reversing maneuver of the equipped vehicle,
wherein the displayed video images are derived from image data captured by said rear backup camera during the reversing maneuver of the equipped vehicle;
wherein the overlay comprises a pair of spaced apart guidelines representative of a predicted vehicle trajectory during the reversing maneuver of the equipped vehicle;
storing a plurality of mathematical formulas in memory, wherein each stored mathematical formula is associated with a respective vehicle wheelbase configuration of a plurality of different vehicle wheelbase configurations;
providing, via a bus communication of the equipped vehicle, a wheelbase configuration input to the processor that is representative of the vehicle wheelbase configuration of the equipped vehicle;
selecting, via the processor, and responsive at least in part to the wheelbase configuration input, a selected mathematical formula from the stored plurality of mathematical formulas;
providing a steering angle input to the processor that is representative of a steering angle of the equipped vehicle during the reversing maneuver of the equipped vehicle;
selecting, via the processor, and responsive at least in part to steering angle of the equipped vehicle during the reversing maneuver of the equipped vehicle, a value to be input into the selected mathematical formula based at least in part on the provided steering angle input;
wherein selecting a value to be input into the selected mathematical formula comprises selecting a value for at least one constant in the selected mathematical formula;
generating a predicted vehicle trajectory overlay by calculating, via the selected mathematical formula and using the selected value, an overlay that is representative of the predicted vehicle trajectory of the equipped vehicle based on the current steering angle of the equipped vehicle, wherein the predicted vehicle trajectory overlay comprises a pair of spaced apart guidelines; and
during the reversing maneuver of the equipped vehicle, (i) displaying video images at the video display screen of the equipped vehicle derived from image data captured by the rear backup camera for viewing by the driver of the equipped vehicle and (ii) superimposing the generated predicted vehicle trajectory overlay over the displayed video images for viewing by the driver of the equipped vehicle.

11. The method of claim 10, wherein providing a steering angle input to the processor comprises providing a steering wheel angle input to the processor that corresponds to a steering wheel angle of a steering wheel of the equipped vehicle.

12. The method of claim 11, wherein, if the vehicle wheelbase configuration of the equipped vehicle is available with different steering gear ratios, said method comprises (i) providing a value in the steering wheel angle input that is representative of when the steering wheel of the equipped vehicle is at full lock, and (ii) determining, via the processor, information regarding the steering gear ratio of the equipped vehicle based at least in part on the provided steering wheel angle input.

13. The method of claim 10, wherein selecting the selected mathematical formula comprises selecting a selected mathematical formula from a lookup table of mathematical formulas stored in memory.

14. The method of claim 10, wherein the plurality of mathematical formulas stored in memory includes a first mathematical formula corresponding to a first vehicle wheelbase configuration and a second mathematical formula corresponding to a second vehicle wheelbase configuration.

15. The method of claim 14, wherein selecting, via the processor, a selected mathematical formula from the stored plurality of mathematical formulas comprises selecting the first mathematical formula responsive to the provided wheelbase configuration input being indicative of the equipped vehicle having the first vehicle wheelbase configuration.

16. The method of claim 14, wherein selecting, via the processor, a selected mathematical formula from the stored plurality of mathematical formulas comprises selecting the second mathematical formula responsive to the provided wheelbase configuration input being indicative of the equipped vehicle having the second vehicle wheelbase configuration.

17. A method for providing backup assistance for a driver of a vehicle, said method comprising:
equipping a vehicle with a rear backup camera having a field of view at least rearward of the equipped vehicle;
providing a processor at the equipped vehicle;
wherein the processor is operable to generate an overlay for superimposing over video images displayed at a video display screen of the equipped vehicle for viewing by a driver of the equipped vehicle during a reversing maneuver of the equipped vehicle,
wherein the displayed video images are derived from image data captured by said rear backup camera during the reversing maneuver of the equipped vehicle;
wherein the overlay comprises a pair of spaced apart guidelines representative of a predicted vehicle trajectory during the reversing maneuver of the equipped vehicle;
storing a plurality of mathematical formulas in memory, wherein each stored mathematical formula is associated with a respective vehicle wheelbase configuration of a plurality of different vehicle wheelbase configurations;
providing, via a bus communication of the equipped vehicle, a wheelbase configuration input to the processor that is representative of the vehicle wheelbase configuration of the equipped vehicle;
selecting, via the processor, and responsive at least in part to the wheelbase configuration input, a selected mathematical formula from the stored plurality of mathematical formulas;

wherein selecting the selected mathematical formula comprises selecting a selected mathematical formula from a lookup table of mathematical formulas stored in memory;

providing, via the bus communication of the equipped vehicle, a steering angle input to the processor that is representative of a steering angle of the equipped vehicle during the reversing maneuver of the equipped vehicle;

selecting, via the processor, and responsive at least in part to steering angle of the equipped vehicle during the reversing maneuver of the equipped vehicle, a value to be input into the selected mathematical formula based at least in part on the provided steering angle input;

generating a predicted vehicle trajectory overlay by calculating, via the selected mathematical formula and using the selected value, an overlay that is representative of the predicted vehicle trajectory of the equipped vehicle based on the current steering angle of the equipped vehicle, wherein the predicted vehicle trajectory overlay comprises a pair of spaced apart guidelines; and during the reversing maneuver of the equipped vehicle, (i) displaying video images at the video display screen of the equipped vehicle derived from image data captured by the rear backup camera for viewing by the driver of the equipped vehicle and (ii) superimposing the generated predicted vehicle trajectory overlay over the displayed video images for viewing by the driver of the equipped vehicle.

18. The method of claim 17, wherein providing a steering angle input to the processor comprises providing a steering wheel angle input to the processor that corresponds to a steering wheel angle of a steering wheel of the equipped vehicle.

19. The method of claim 17, wherein the lookup table of mathematical formulas stored in memory includes a first mathematical formula corresponding to a first vehicle wheelbase configuration and a second mathematical formula corresponding to a second vehicle wheelbase configuration.

20. The method of claim 19, wherein selecting, via the processor, a selected mathematical formula from the lookup table of mathematical formulas stored in memory comprises selecting the first mathematical formula responsive to the provided wheelbase configuration input being indicative of the equipped vehicle having the first vehicle wheelbase configuration.

21. The method of claim 17, wherein the bus communication comprises a LIN bus of the equipped vehicle.

* * * * *

UNITED STATES PATENT AND TRADEMARK OFFICE
CERTIFICATE OF CORRECTION

PATENT NO.          : 10,559,134 B2
APPLICATION NO.     : 16/234760
DATED               : February 11, 2020
INVENTOR(S)         : Joel S. Gibson et al.

Page 1 of 1

It is certified that error appears in the above-identified patent and that said Letters Patent is hereby corrected as shown below:

Column 3
Line 7, "100°" should read --100"--
Line 12, "120°" should read --120"--

Signed and Sealed this
Tenth Day of March, 2020

Andrei Iancu
*Director of the United States Patent and Trademark Office*